Patented Apr. 30, 1946

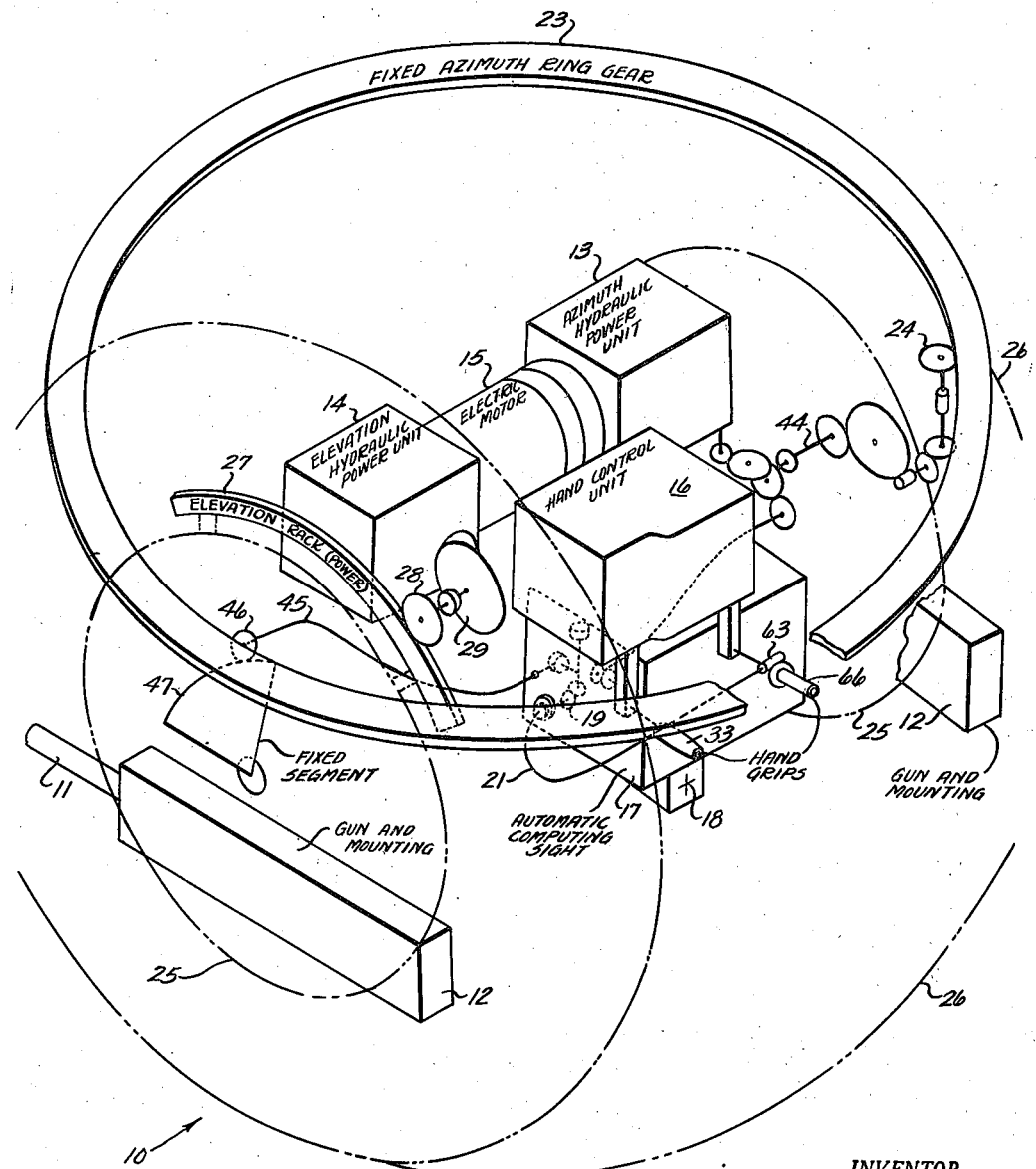

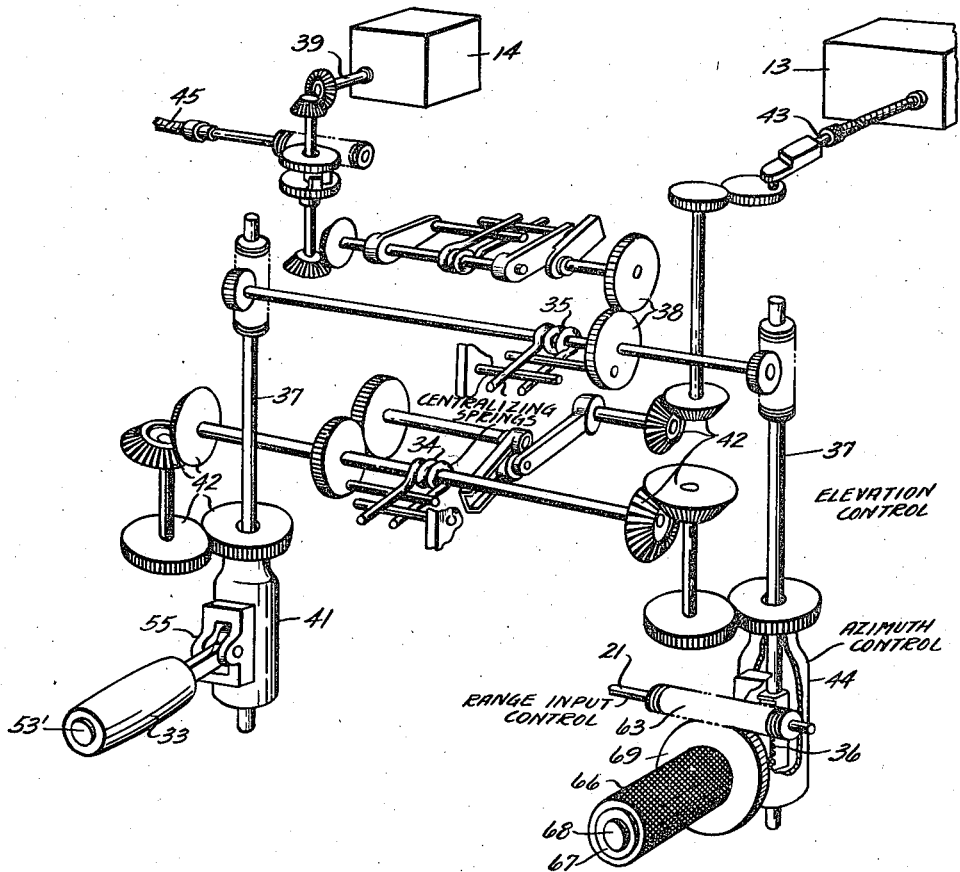

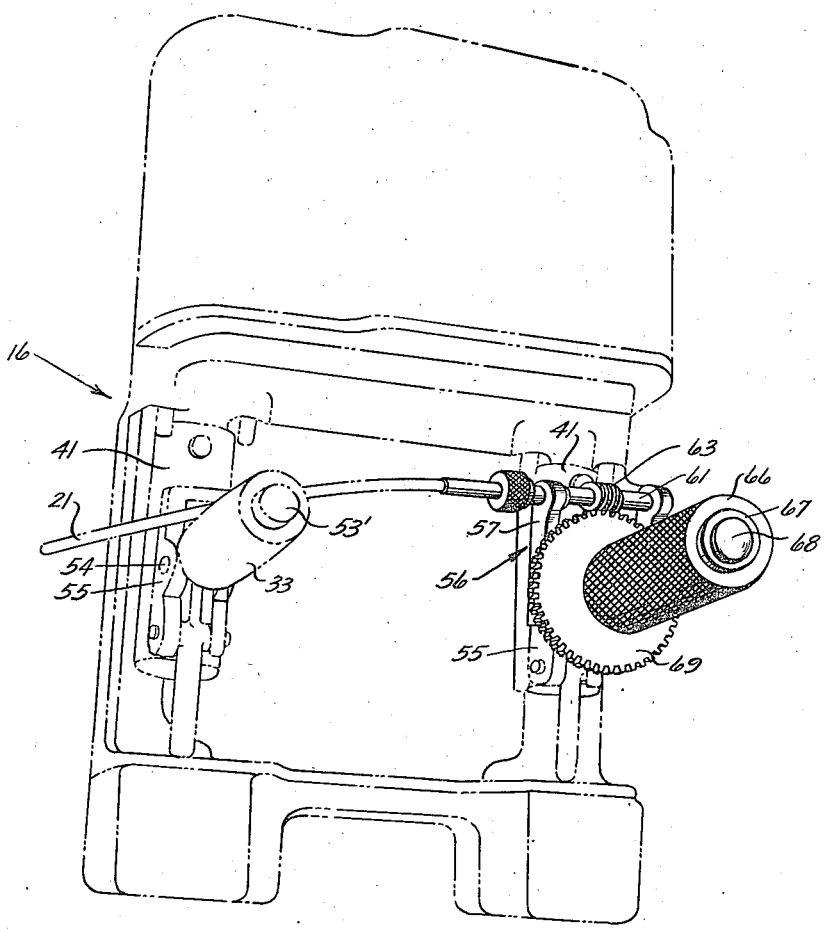

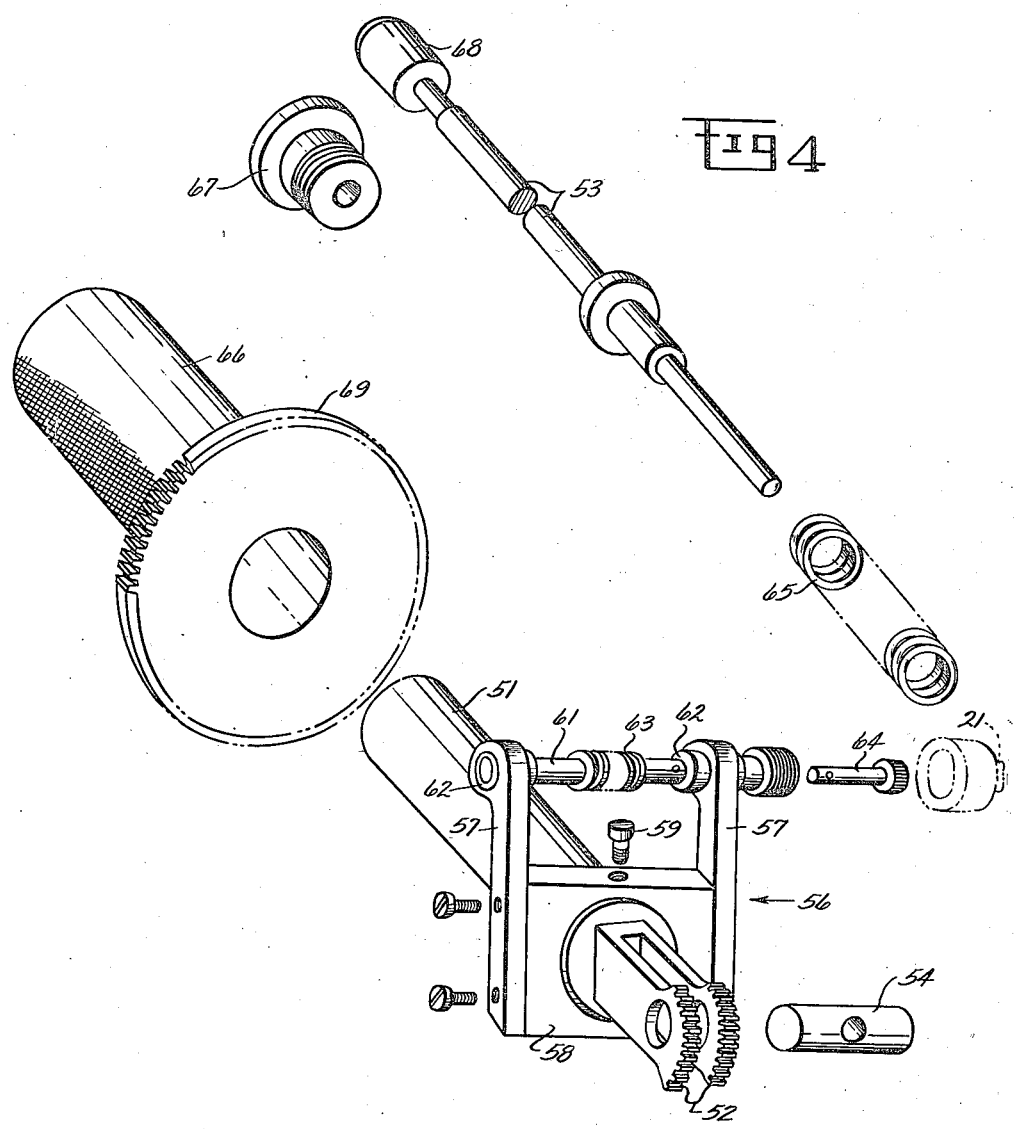

2,399,200

UNITED STATES PATENT OFFICE 2,399,200

RANGE INPUT AND HAND CONTROL UNIT FOR AIRCRAFT TURRET GUNS

Wesley H. Brown, Peoria, Ill.

Application April 9, 1945, Serial No. 587,418

3 Claims. (Cl. 89—41)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to an improved hand control unit for controlling the movement of airplane turret guns in azimuth and in elevation, and also for controlling the range input means on the sight computing device for such guns; said assembly being more particularly adapted for installation on the hand control unit used for controlling the machine guns on a Sperry lower ball turret.

One of the essential objects of this invention is to provide a simplified control unit or device involving a single handgrip which is conveniently actuated by one hand for promptly and accurately controlling, not only the movements of the guns in azimuth and in elevation, but likewise also controlling the range input means on the computing sight, which was heretofore usually operated by a separately positioned control element, as a separate foot pedal, that caused a leg-tiring operation and produced an unsteady result.

A more particular object of this invention is to provide an improved range control unit including a handgrip which can be readily combined with or mounted onto the hand-actuated control elements of the known hand control assembly heretofore used on a Sperry ball turret for controlling the hydraulic power means which move the machine guns in azimuth and in elevation, so that with the use of my novel control unit and by grasping the one control member or handgrip you can promptly actuate the range input control element of the computing sight as well as actuate the control elements of said known azimuth and elevation power means of the gun.

These and various other objects and advantages are attained with this invention as will become apparent from the following description, taken in connection with the accompanying drawings wherein this invention is disclosed in its preferred form of construction and application, it being evident that other arrangements and modifications may be resorted to in carrying out the objects and purposes of this invention.

In the drawings:

Fig. 1 is a schematic view of the turret with its guns and the control means having my invention applied thereto.

Fig. 2 is a schematic view of the gear mechanisms of the hand control unit including my invention.

Fig. 3 is an elevational view of the hand control unit and range input control element with my invention applied thereto.

Fig. 4 is an exploded view of my improved hand control unit showing the various elements separated.

This invention is adapted for use in controlling the movement of aircraft turret guns and also the range input of the computing sight thereof; and my improved hand control unit is more particularly adapted for use in the Sperry lower ball turret, which is more fully disclosed in the Instruction Book No. 14–230 of the Sperry Gyroscope Company, Brooklyn, New York.

My invention is illustrated in the drawings (see Fig. 1) as being applied to the hand control unit in the ball turret 10 which is mounted on the fuselage of an airplane and which houses the machine guns 11 with their mountings 12, and also houses the necessary equipment for the gunner in accurately directing the fire of the guns. Said turret 10 also houses the two hydraulic power units 13 and 14, the unit 13 for moving the turret with its guns in azimuth and the unit 14 for moving the turret and guns in elevation, said units having the electric motor 15 mounted therebetween and common to both. These two units and the motor form the hydraulic power system which provides the gunner with the power for obtaining easily controlled smooth motion of the turret with its guns as the target is being tracked in azimuth and in elevation. The turret also houses the hand control unit 16 associated with said hydraulic power system for controlling and actuating each of said power units independently to move the turret with its guns either in azimuth or in elevation.

The turret 10 furthermore contains the automatic computing sight mechanism 17 which is mounted between the guns and comprises an optical system 18, a range device 19, and an automatic computing device, not shown, all as a single unit. The optical system of this mechanism is used to locate the target, and the range device determines the distance between the observer and the target, while the automatic computing device solves prediction and ballistic deflections for the projectile and transmits these solutions to the optical system, causing the line of sight to be offset from the gun bore thus requiring the gunner to move the sight to realign it on the target and also to adjust the guns accordingly. In action the gunner moves the sight and also the guns in azimuth and in elevation until the target can be seen in the view, thus "tracking" the target. The input control element 21, which is in the form of a flexible cable, is then actuated to adjust the range device 19, thus "ranging" the target, until the vertical reticles "frame" the target, and at this instant the gun is fired.

A ring gear 23 is fixedly mounted to the lower part of the fuselage and an azimuth pinion 24 in said turret runs on said ring gear for rotating the turret in azimuth. Said turret comprises the rotary azimuth portion which includes two outer side caps 25 that are only rotary relative to said ring gear 23, but are not movable in elevation thereon; and the turret comprises a main inner portion 26 which rotates along with said caps in azimuth, and is also movable in elevation therebetween. An elevation rack 27 is mounted fixed in elevation but movable in azimuth along with caps 25 and has a pinion 28 meshing therewith and driven by a gear train 29 actuated by the hydraulic unit 14 to drive the inner portions 26 of the turret in elevation, said portion 26 containing all the main units of the turret and gun moving mechanism.

In the heretofore known and used devices of this type, the hand control assembly or unit 16 has been provided with a pair of known handgrips 33 which extend from the unit to be gripped by the hands of the gunner and turned in azimuth and in elevation to control the motion of the turret and the guns in these planes. The two handgrips are connected so as to move together, and when they are released they will return to their neutral center position, as indicated by the centralizing springs 34 and 35 in Fig. 2. Movement of the turret in elevation is controlled by the gunner moving either handgrip in a substantially vertical plane, upward and forward, or reversely downward and rearward, according to the elevational position of the main turret portion 26 with the guns 11 mounted therein; whereby the action from the said handgrip 33 is transferred through its segment teeth to the engaged teeth 36 of the associated rack bar or control element 37 to move it vertically and thereby actuate the gear train 38 and the shaft 39 and transmit action to the hydraulic power unit 14 for actuating the turret with its guns. Movement of the turret in azimuth is controlled by movement of either handgrip in a lateral direction, in a plane substantially at right-angles to said vertical plane, thereby rotating the associated azimuth control element 41 and operating through the connected gear train 42 to move shaft 43 and cause action of the azimuth hydraulic power unit 13. Said power unit drives the gear train 44 and thereby the pinion 24 which meshes with the stationary ring gear 23 fixed upon the fuselage, thereby rotating the entire turret 10 with its guns 11 in azimuth. A flexible shaft 45 is rotated by a pinion 46 running on a fixed segment 47 attached to the cap 25, said shaft operating through suitable gear means to limit the elevation movement of the turret and guns.

In the automatic computing sight 17 on such gun turret heretofore in use, especially on the Sperry lower ball turret, the flexible cable or range input control element 21 was actuated by a foot pedal, which made the action unsteady and also became a very tiresome job; while in some mechanisms the cable was controlled by a separate hand wheel placed near the customary handgrip whereby the movement of the guns is controlled in azimuth and in elevation. However, in either case a separate member has heretofore been required which necessitated a separate foot action or hand action, and thus required the additional engaging and operating of an additional control member apart from the handgrip, for operating the range input control element 21.

With my improved construction and application of my novel control unit, I have the entire mechanism arranged so that a single handgrip or unitary member can be grasped and actuated by one hand for quickly and accurately operating all three control elements, whereby to control the range input of the computing sight, as well as to control the movement of the guns in azimuth and in elevation, by the one hand holding and operating the one novel control member.

This improved range input and hand control unit is preferably mounted in place of either one of the previously known and used handgrips 33; or an improved control unit may be substituted for and mounted in place of each handgrip heretofore in use.

My improved control unit in the form illustrated (see especially Fig. 4) comprises a tubular shaft 51 containing a ratchet segment 52 at its inner end and carrying in its axial channel a firing rod 53 slidable longitudinally therein. Said tubular shaft and firing rod serve the like purposes as the previously known and used handgrip 33 with its firing rod 53' therein, and similarly thereto this tubular shaft 51 is mounted at its inner end by a pivot pin 54 in the customary supporting bracket 55 provided on the rotary control element 41 of the hand control device 16. A rack 56 includes a pair of bracket arms 57 which have a block 58 secured therebetween, and said rack is fastened by a set screw 59 onto the tubular shaft 51 to move with said shaft. A shaft 61 is rotatably mounted in bearings 62 formed in the ends of said bracket arms 57 and has a helical gear 63 fixed thereon. A connecting member 64 provides connection between said gear shaft 61 and the flexible shaft or input control element 21 which actuates the range input device 19 of the computing sight. A spring 65 urges the firing rod 53 outward into its neutral position; and the firing rod, when depressed by the thumb or finger of the gunner, actuates a micro-switch to cause firing of the guns, the same as in the known control devices.

A sleeve-like member in the form of a handgrip 66 is mounted rotatably around the tubular shaft 51, and is retained in its operative position thereon by a cap 67 threaded into the outer end of the shaft. A head 68 on the end of the firing rod protrudes to the outer end of said cap. A gear 69 is provided on the inner end of said handgrip or control member 66 and has helical teeth meshing with the teeth of the helical gear 63, so that by simply rotating the handgrip 66 on the tubular shaft 51 the helical gear or helix 63 is rotated and thereby actuates the flexible cable or range input control element 21, as is best observed by viewing Figure 3 of the drawings. By moving this handgrip 66 with its tubular shaft 51 in a vertical plane the operator can control the movement of the turret with its guns in elevation, and by moving the handgrip with its tubular shaft laterally the movement of the turret and guns is controlled in azimuth; while the firing of the guns is controlled by depressing the head 68 with rod 53, as in the previously known devices.

It is apparent from the above disclosure that this improved control unit can be used in place of either the left-hand or the right-hand conventional control grip, heretofore in use, and that with this novel control device the range input control element is promptly and smoothly operable by hand, instead of footpower, thereby lessening the fatigue of the gunner. Furthermore, this improved control device, obviates the use of a separately mounted and additionally engageable range input control device and thus provides more direct and positive control of the reticle of the computing sight, which results in more accurate ranging of the targets.

I claim:

1. In a control mechanism for an aircraft gun of the type which is provided with means for moving the gun in azimuth, means for moving the gun in elevation, a separate control element for actuating each of said gun moving means, and a gun sight computing mechanism including a range adjusting device having a range input control element, the improvement which comprises a hand control unit including a single hand-held member and means operatively connecting it with all of said control elements and having a differently directed movement for separately actuating each of said control elements, so that the range input device as well as either one of said gun moving means can be controlled by the one hand holding and moving said member in the respective direction.

2. In a control mechanism for an aircraft gun turret of the character having power means for driving the turret in elevation, power means for rotating the turret in azimuth, a gun sight computing mechanism including a range adjusting device and having a range input control element, and separate control elements for each of said power means, the improvement which comprises a hand control unit including a handgrip movable in two planes at right angles to each other and also rotatable about its own axis being operatively connected with each of said control elements for independently actuating the same, said handgrip when movable in one plane being operative to control the turret in elevation, in the other plane to control the turret in azimuth, and when rotated about its axis to control the computing sight range input control element.

3. In a control mechanism for a gun-equipped aircraft ball turret of the character having power means for driving the turret in elevation, power means for rotating the turret in azimuth, a control element for each of said power means, and a gun sight computing mechanism including a range adjusting device and having a range input control element, the improvement which comprises a hand control unit including a sleeve-shaped handgrip having therein a shaft with a gun-firing pin, said unit being mounted on said mechanism to be turnable in two planes at right angles to each other and said grip being also rotatable about said shaft, said shaft having operative connections with said control elements of the two power means for independently actuating the same, and said handgrip and shaft being provided with cooperating gear means operatively connected with said range input control element, so that the actuation of the handgrip with its shaft in one plane will control the turret in elevation, and in the other plane will control the turret in azimuth, and when the handgrip is rotated on said shaft it will actuate said gear means and thereby the range input control element.

WESLEY H. BROWN.